United States Patent [19]

Witheridge et al.

[11] Patent Number: 5,296,848
[45] Date of Patent: Mar. 22, 1994

[54] METHOD AND APPARATUS FOR TRIGGERING AN AUTOMATIC TRANSMISSION

[75] Inventors: Neil Witheridge, Glebe; Tapas K. Debray, Seven Hills, both of Australia

[73] Assignee: Sony (Australia) Pty Limited, North Ryde, Australia

[21] Appl. No.: 769,830

[22] Filed: Oct. 1, 1991

[30] Foreign Application Priority Data

Oct. 23, 1990 [AU] Australia .................. PK2986

[51] Int. Cl.⁵ .............................. H04Q 1/00
[52] U.S. Cl. .................. 340/825.040; 340/825.240
[58] Field of Search ........... 340/825.04, 825.24, 340/825.25; 455/3.1, 4.1; 358/181, 185

[56] References Cited

U.S. PATENT DOCUMENTS 4,862,159 8/1989 Marusa et al. ............ 340/825.24
5,060,068 10/1991 Lindstrom ................. 358/185
5,115,310 5/1992 Takano et al. ............. 358/185

Primary Examiner—Donald J. Yusko
Assistant Examiner—Edwin C. Holloway, III
Attorney, Agent, or Firm—William S. Frommer; Alvin Sinderbrand

[57] ABSTRACT

A multi-channel automatic transmission system, which is used with a number of regional transmitters, replaces functions previously performed in a network studio by a number of single channel automatic transmission systems corresponding to the number of regional transmitters. Outputs from either a computer or a manual input device are selectable by a switch to operate the system in accordance with a stored first selection of commercial messages, a manually determined second selection of commercial messages, or a manually altered selection. The duration and commencement of the commercial break is the same throughout the network but the number, duration and sequence of the commercial messages transmitted by each regional transmitter can be different.

11 Claims, 3 Drawing Sheets

METHOD AND APPARATUS FOR TRIGGERING AN AUTOMATIC TRANSMISSION

The present invention relates to automatic transmission systems and, in particular, to multi-channel transmission of audio/video material from a single automatic transmission system.

Although the present invention will be described in relation to television, the invention is not limited thereto and can also find application in radio broadcasting.

BACKGROUND ART

With the advent of television networking, and in particular broadcasting of a common core program from a network studio to several regions or regional transmitters, a need has arisen for the transmission from a single studio of different sequences of play items simultaneously. This need arises in the following way. The network transmits a core programme of entertainment to transmitters servicing each region of the network simultaneously. However, each region of the network is based around a major population centre and its hinterland. As a result, the viewers of each region constitute separate markets for some types of advertisements. Thus during commercial breaks, local advertisers wish to have their advertisement displayed within their own region, but not also displayed within any of the other regions in the network.

As a consequence of this need, it is necessary for different advertisements to be displayed in each of the different regions in the network. Since each advertisement is not of an identical duration, it is necessary for the advertisements to be carefully scheduled in order that the commercial break at each station be of identical duration so that all commercial breaks can commence and finish simultaneously.

Hitherto, this requirement for simultaneous, but different, commercial breaks has been met by the network studio having a single channel automatic transmission system (ATS) for each region which arranges for the sequential transmission of each of the advertisements which is to be displayed during the commercial break.

However, such automatic transmission systems are relatively expensive pieces of equipment (A$250,000-A$1,000,000) including as they do an elaborate cartridge storage and retrieval system, and at least two and typically four VCR's which play respective cassettes in the sequence of advertisements.

In order to reduce overall costs in the network, it would be desirable to have a multi-channel automatic transmission system which could simultaneously broadcast different sequences of advertisements for each of the regions in the network during a network wide commercial break. Thus the central network studio need posses fewer ATS's to service the number of regions.

OBJECT OF THE INVENTION

It is the object of the present invention to achieve the intended reduction in network costs by the provision of both a method of, and apparatus for, triggering an automatic transmission system (ATS) to operate in accordance with a previously stored first selection, or a manually determined second selection, or manually altered selection.

SUMMARY OF THE INVENTION

In accordance with the first aspect of the present invention there is disclosed a method of triggering an automatic transmission system [ATS] to operate in accordance with a previously stored first selection, or a manually determined second selection; said method comprising the steps of storing said first selection in a control computer, providing a manual input device through which said second selection can be entered, connecting an output of said control computer and said input device to a switch means having an output connected to the controller of said ATS, and operating said switch means to allow said first selection to proceed whilst suspending the operation of said manual input device, or to allow said second selection to proceed whilst suspending the operation of said previously stored first selection, or to allow said manual input device to modify said stored first selection enroute to said ATS controller. Preferably, a time synchronizing signal is supplied to said ATS controller and said control computer. In addition, said stored first selection is modified by skipping an event, freezing an event, re-cueing an event, and/or executing the next event. If desired, said first stored selection is modified by editing the sequence of events and/or introducing and deleting events.

In accordance with a second aspect of the present invention there is disclosed apparatus for triggering an automatic transmission system (ATS) to operate in accordance with a previously stored first selection or a manually determined second selection, said apparatus comprising a control computer having storage means in which said first selection is stored, an output of said computer and a manual input device being connected as inputs to a switch means, and the output of said switch means being connected to the controller of said ATS; wherein said switch means is operable to allow said first selection to proceed whilst suspending the operation of said manual input device, or to allow said second selection to proceed whilst suspending the operation of said previously stored first selection, or to allow said manual input device to modify said stored first selection enroute to said ATS controller. Preferably, a time and code control generator having a synchronizing output signal is provided, said synchronizing output signal being connected to both said ATS controller and said control computer.

BRIEF DESCRIPTION OF THE DRAWINGS

An embodiment of the present invention will now be described with reference to the drawings in which.

DETAILED DESCRIPTION

Figure 1:
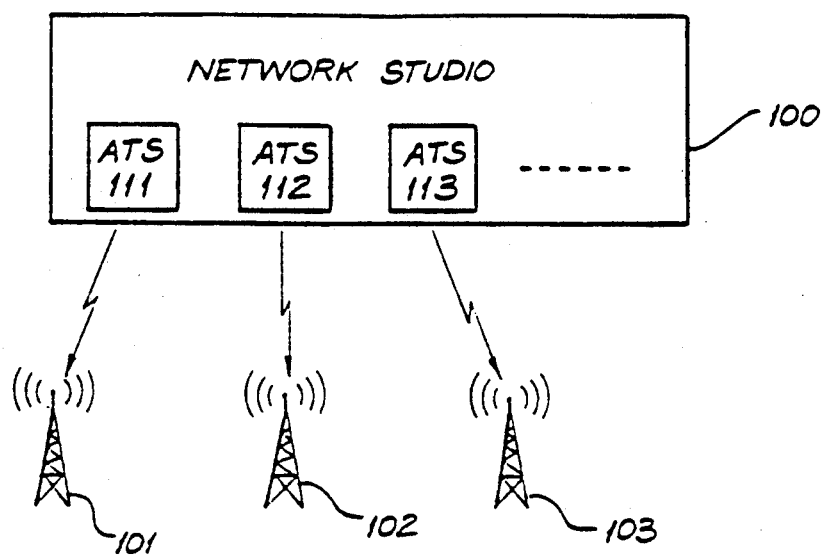
FIG. 1 is a schematic representation of the prior art arrangement where a single network studio services a number of regions.

FIG. 1 illustrates the prior art arrangement in which a single network studio 100 services a number of regions each of which has its own local regional transmitter 101, 102, 103, and so on. The programme for each of the regional transmitters 101–103 is determined by a corresponding single channel automatic transmission system (ATS) 111, 112, 113 and so on. As each ATS costs A$250,000–A$1,000,000 the capital costs associated with the central network studio 100 have hitherto been very high.

Figure 2:
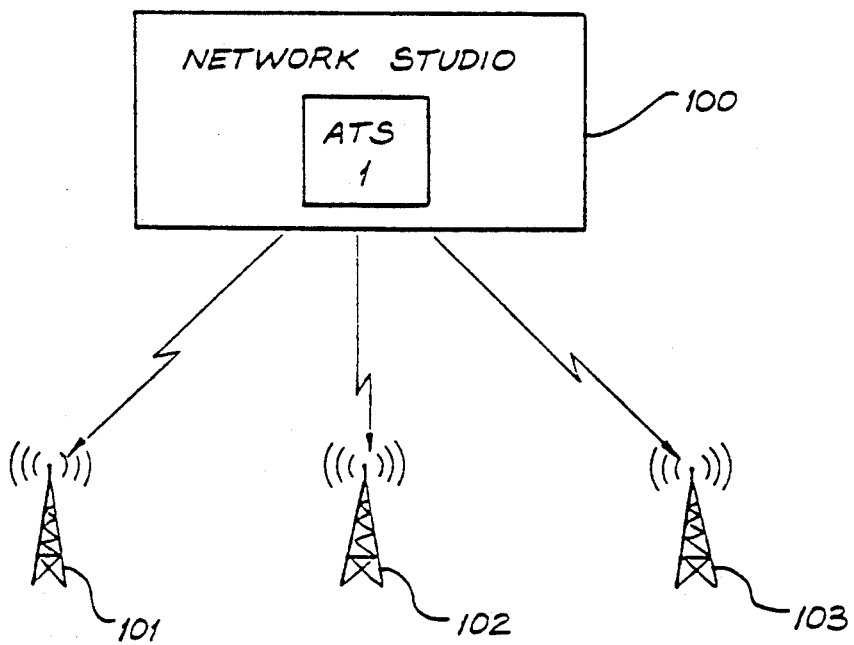
FIG. 2 is a representation similar to FIG. 1 but for the arrangement of the preferred embodiment.

The corresponding arrangement in accordance with the preferred embodiment is illustrated in FIG. 2. Here it will be seen that the central network studio 100 utilizes only a single multi-channel ATS 1 which is able to determine the programme for each of the regional transmitters 101–103 simultaneously.

Figure 3:
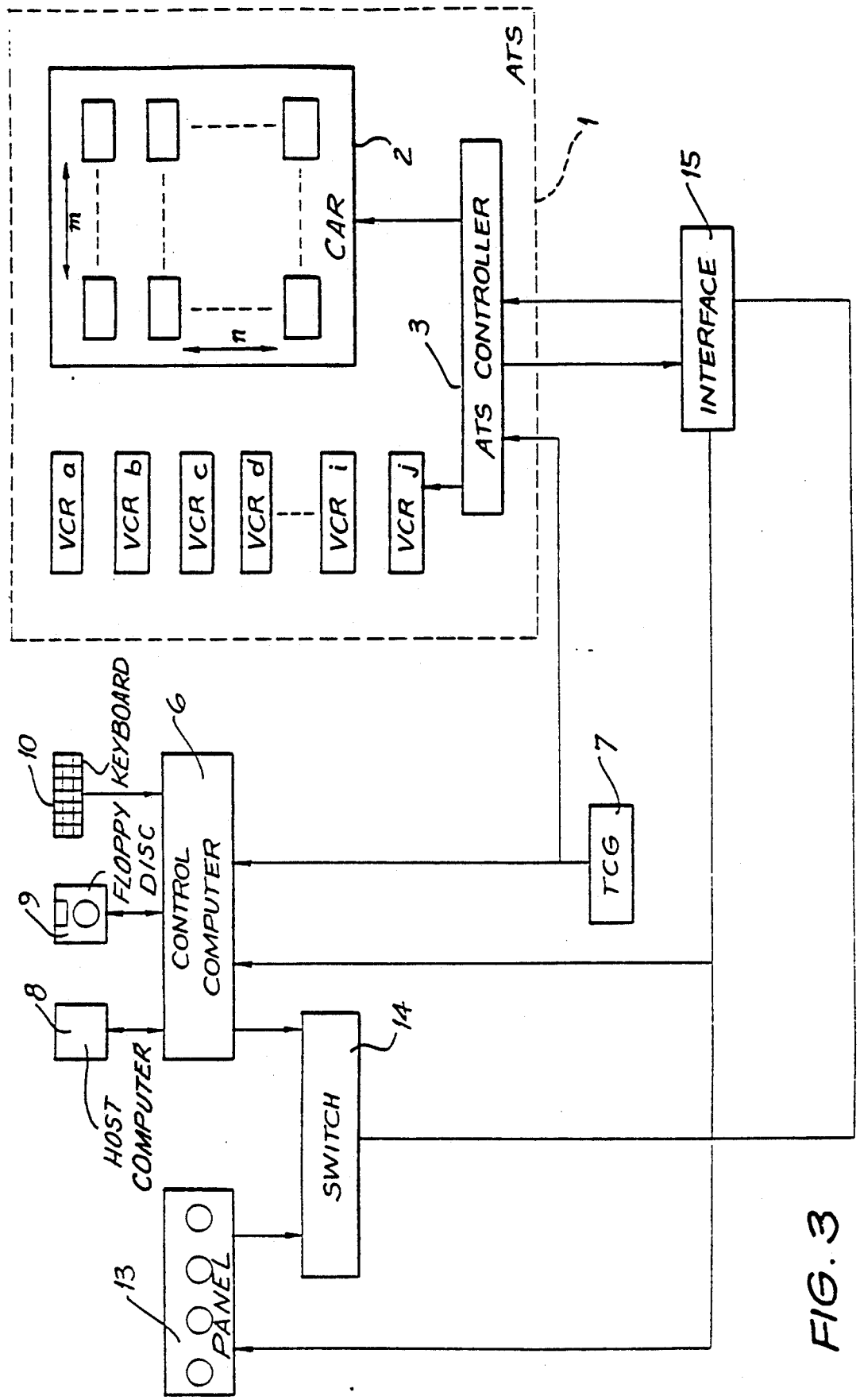
FIG. 3 is a block diagram of the apparatus which enables multi-channel operation by an automatic transmission system (ATS)

Referring now to FIG. 3, the automatic transmission system (ATS) 1 of the preferred embodiment is illustrated schematically. Included within the ATS 1 is a cartridge access and retrieval (CAR) device 2 which is essentially conventional and consists of an array of n rows and m columns of cartridge storage locations and a transport mechanism (not illustrated). The transport mechanism is able to retrieve a cartridge from a nominated storage position and enter it into one of a number of VCRs, VCRa–VCRj in order to enable the VCR to play the contents of the cartridge. At the end of the cartridge playing time, the cartridge is able to be removed from the VCR and returned to its storage location by the transport mechanism.

A conventional ATS has only a small number of VCRs (typically at least two such as VCRa and VCRb). Normally four VCR's would be used but the minimum number of VCR's which must be present is that which will guarantee uninterrupted transmission of advertisements of a fixed minimum duration. These VCR's play consecutive cartridges in a sequence of advertisements.

Since the ATS 1 of the preferred embodiment is intended for multi-channel operation there are further VCR's required to provide uninterrupted transmission assuming the same minimum advertisement duration. These VCRs are indicated as VCRa to VCRi. The CAR device 2 and VCR's are under the control of an ATS controller 3.

In order to arrange for the necessary control and sequencing of the ATS 1, a control computer 6 (which preferably takes the form of a small personal computer), and a time and control code generator (TCG) 7 are provided. This time code generator is accurate to at least the time of one frame of a television signal and provides a synchronizing signal to both the control computer 6 and the ATS 3. In addition, the control computer 6 is able to receive inputs from any one or more of a host computer 8, a floppy disc 9 and a keyboard 10.

A push button panel 13 is also provided for manually entered data regarding the desired operation of the ATS 1 to be conveyed to the ATS 1. For example during live outside sporting broadcasts the commencement of a commercial break can be manually determined depending on the action at the sports arena. This is achieved by the connection of the both the push button panel 13 and the computer 6 to respective inputs of a switch 14. The output of the switch 4 is connected to the ATS controller 3 via an interface 15 which converts the parallel output of the switch 14 into a serial input for the ATS controller 3. Should the ATS controller 3 include a parallel input/output port, the interface 15 would not be required.

In addition, the interface 15 receives data from the ATS controller 3 and sends it to the control computer 6 for the purpose of logging and data re-freshing of the current state of the ATS 1, and to the panel 13 for display of the current state of the ATS 1 on the push button panel 13 e.g. by means of tally signals.

Figure 4:
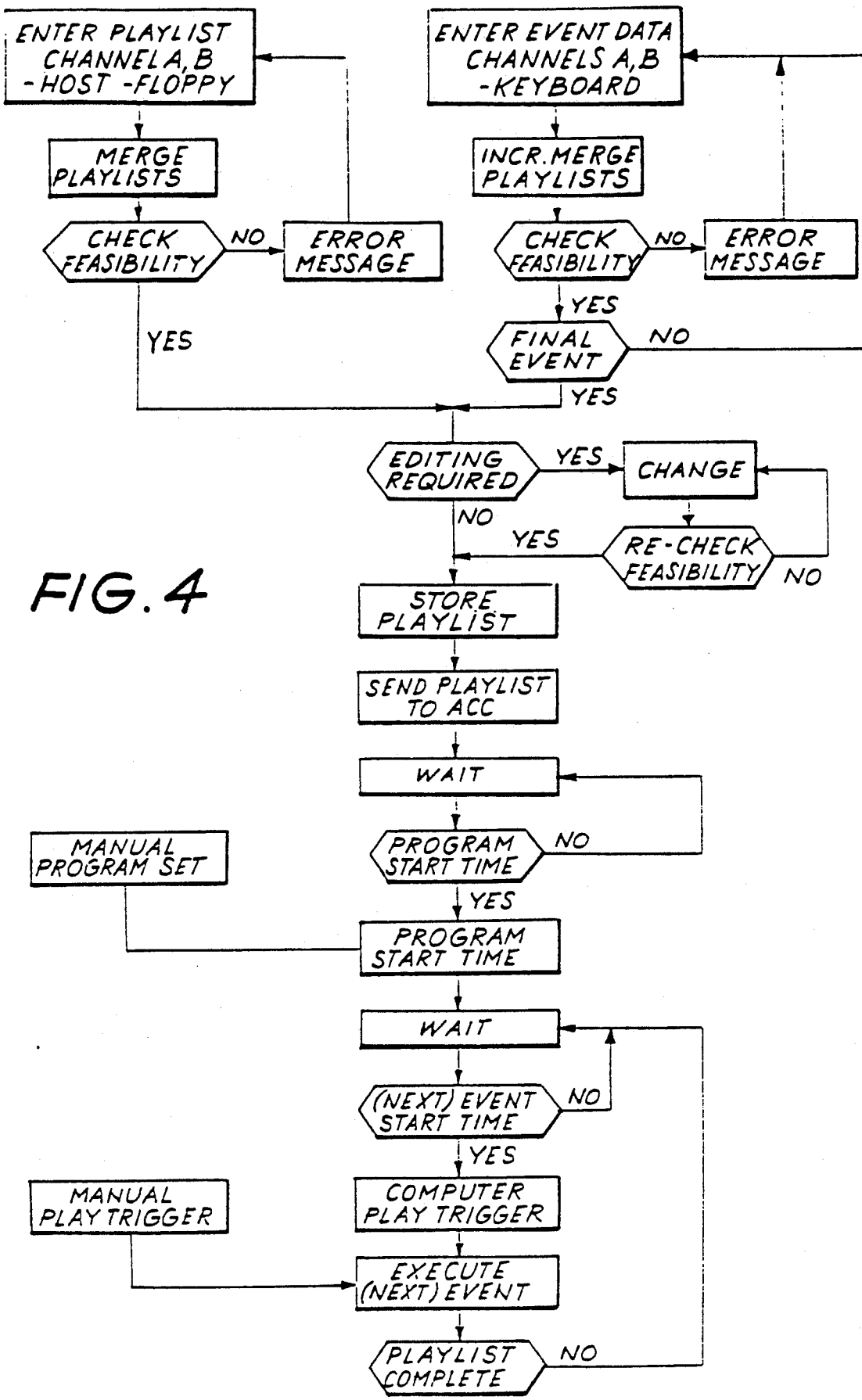
FIG. 4 is a flowchart showing the sequence of operations for the necessary scheduling.

Turning now to FIG. 4, a flowchart of the scheduling arrangements is illustrated. The flowchart is of generally Y-shaped configuration.

The top righthand arm of the Y deals with the keyboard entry of data, and the upper lefthand arm of the Y of the flowchart deals with the host computer or floppy disk transfer of data. This data in both instances relates to the playlist for each commercial break for each of the channels or stations of the network. The entry via the keyboard 10 allows the incremental checking on an event by event basis as the playlist data is entered. It is necessary to determine that the sum of the play durations of each play item of the sequence of each channel, is identical to the total duration of the playlist. That is to say it is not possible for channel A to play two commercials each of 90 seconds duration whilst channel B, for example, plays two 60 second commercials and one 90 second commercial since the commercial break on channel B would then be of a different duration from the commercial break on channel A.

Most importantly, since the CAR device 2 of FIG. 3 has a finite access time for the removal and retrieval of cartridges, it is also necessary to ensure that the access time of each play item and the total duration of all preceding play items in the sequence do not prevent uninterrupted transmission of the sequence of advertisements for each channel.

When the two abovementioned procedures have been carried out, a complete schedule of the intended programme is then available and is stored in the control computer 6. The time code generator 7 provides the timing information necessary to enable the control computer 6 to determine that the programme start time has occurred. When this happens, the control computer 6 via the switch 14 and interface 15 enables the ATS controller 3 thereby commencing the programme. The sequence of events stored in the control computer 6 then takes place with synchronization being provided by the time control generator 7. As a consequence, the core programme is transmitted to all the channels or stations in the network and at each commercial break, which is simultaneously broadcast on all channels, a different sequence of advertisements is broadcast for each channel.

In order to cater for various day-to-day operational situations which arise in broadcasting; it is desirable to enable manual instructions to be inserted via the push button panel 13 which can commence a programme, result in execution of the next event, freeze an event or re-cue an event. This may be necessary because of a defect in a cartridge which only becomes apparent when the cartridge actually malfunctions or because of last minute withdrawal of a previously schedule advertisement.

The switch 14 has three modes of operation. The first mode is a dominant or "override" mode. Here the push button panel 13 has a higher priority than the control computer 6. This enables a schedule to be put together or modified if for some reason, the control computer 6 is not available or is not functioning. In addition, in this mode the programme sequence can be changed by skipping or jumping over events by selection of the appropriate push buttons.

The second mode for the switch 14 is the "automatic" mode in which scheduling is under the control of the control computer 6 and there is no manual input.

The third mode is an "inclusive-OR" mode in which operator care is required to be exercised to prevent conflicting instructions from being ensued. For example, a schedule for channel A can be under automatic control from control computer 6 but a schedule for channel B can be manually amended via push button panel 13 without there being any conflict with the operation of channel A. Typically the push button panel 13 also includes freeze, re-cue and play buttons.

The foregoing describes only one embodiment of the present invention and modifications, obvious to those skilled in the art, can be made thereto without departing from the scope of the present invention.

For example, push button panel 13 and computer 6 can communicate with each other to allow a wider range of manual modifications or editing to be permitted. This allows for manually controlled insertion and deletion of events to be achieved. Again, operator care is required.

Also TCG 7 can be omitted if a video reference signal is used instead. Alternatively, accurate internal clocks can be used so long as the ATS clock is in synch with the control computer's clock.

We claim:

1. A method of triggering an automatic transmission system so as to broadcast a plurality of selected sequences of events of video and/or audio signals, said method comprising the steps of:
    storing a first selection of said events in a control computer;
    summing play durations of each of said events of said first selection to be broadcasted;
    entering a second selection of said events to input means;
    supplying an output signal from said control computer corresponding to said first selection to switch means when said summed play duration equals a reference duration;
    supplying to said switch means an output signal from said input means corresponding to said second selection; and
    operating said switch means so as to supply to said automatic transmission system an output signal corresponding to one of said first selection, said second selection and a third selection of said events, said third selection being obtained by modifying said first selection by said input means, so as to trigger the automatic transmission system and enable each of said sequences to be simultaneously broadcast over a respective one of a plurality of broadcast channels.

2. A method according to claim 1, further comprising the step of supplying a time synchronizing signal to said automatic transmission system and said control computer.

3. A method according to claim 1 or 2, wherein said first selection is modified so as to obtain said third selection by freezing at least one of the respective events, and executing a subsequent event.

4. A method according to claim 1 or 2, wherein said first selection is modified so as to obtain said third selection by re-cuing at least one of the respective events, and executing a subsequent event.

5. A method according to claim 1 or 2, wherein said first selection is modified so as to obtain said third selection by skipping at least one of the respective events, and executing a subsequent event.

6. A method according to claim 1, wherein said first selection is modified so as to obtain said third selection by editing the respective sequence of events.

7. A method according to claim 1, wherein said first selection is modified so as to obtain said third selection by adding and deleting selected ones of the respective events.

8. An apparatus for triggering an automatic transmission system so as to broadcast a plurality of selected sequences of events of video and/or audio signals, said apparatus comprising:
    control computer means for storing a first selection of said events, each of said events having a predetermined play length, and for supplying an output signal corresponding to said first selection when a sum of said predetermined play lengths of said events of said first selection equals a reference length;
    means for entering a second selection of said events and for supplying an output signal corresponding thereto;
    switch means for receiving the output signals from said means for entering and said control computer means and for supplying a signal corresponding to one of said first selection, said second selection and a third selection of said events, said third selection of events being obtained by modifying the output signal corresponding to said first selection of said events, to said automatic transmission system so as to trigger the same and enable each of said sequences to be simultaneously broadcast over a respective one of a plurality of broadcast channels.

9. Apparatus according to claim 8, further comprising time and control code generator means for generating a synchronizing output signal for supply to said automatic transmission system and said control computer means.

10. Apparatus according to claim 8 or 9, further comprising interface means coupled between said automatic transmission system and said switch means for converting the signal supplied from said switch means which contains data in a parallel data format into a signal having a serial data format so as to be acceptable to said automatic transmission system.

11. Apparatus according to claim 10, wherein said interface means receives logging and refreshing data from said automatic transmission system and transmits same to said control computer means and said interface means additionally receives current state data from said automatic transmission system and transmits same to said means for entering a second selection.

* * * * *